(12) United States Patent
Kim

(10) Patent No.: US 11,126,342 B2
(45) Date of Patent: Sep. 21, 2021

(54) ELECTRONIC DEVICE FOR CONTROLLING IMAGE DISPLAY BASED ON SCROLL INPUT AND METHOD THEREOF

(71) Applicant: SAMSUNG ELECTRONICS CO., LTD., Suwon-si (KR)

(72) Inventor: Haksub Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1 day.

(21) Appl. No.: 16/237,856

(22) Filed: Jan. 2, 2019

(65) Prior Publication Data

US 2019/0205003 A1 Jul. 4, 2019

(30) Foreign Application Priority Data

Jan. 4, 2018 (KR) .................. 10-2018-0001129

(51) Int. Cl.

| | |
|---|---|
| *G06F 3/0485* | (2013.01) |
| *G06T 5/00* | (2006.01) |
| *G06F 3/0481* | (2013.01) |
| *G06F 3/01* | (2006.01) |
| *G06F 3/038* | (2013.01) |

(52) U.S. Cl.
CPC ............ *G06F 3/0485* (2013.01); *G06F 3/011* (2013.01); *G06F 3/012* (2013.01); *G06F 3/038* (2013.01); *G06F 3/04815* (2013.01); *G06T 5/002* (2013.01); *G06F 2203/0383* (2013.01)

(58) Field of Classification Search
CPC ........................................................ G06F 3/14

USPC .............................................. 715/784; 345/8
See application file for complete search history.

(56) References Cited

U.S. PATENT DOCUMENTS

| | | |
|---|---|---|
| 8,970,452 B2 | 3/2015 | Wheeler et al. |
| 9,311,718 B2 | 4/2016 | Scavezze et al. |
| 10,025,399 B2 | 7/2018 | Kim et al. |
| 10,025,451 B2 | 7/2018 | Jin et al. |
| 2013/0106674 A1 | 5/2013 | Wheeler et al. |

(Continued)

FOREIGN PATENT DOCUMENTS

| | | |
|---|---|---|
| JP | 2016-122298 | 7/2016 |
| KR | 10-1999-0040631 | 6/1999 |

(Continued)

OTHER PUBLICATIONS

International Search Report dated Apr. 25, 2019 in counterpart International Patent Application No. PCT/KR2018/016760.

(Continued)

*Primary Examiner* — Ruay Ho
(74) *Attorney, Agent, or Firm* — Nixon & Vanderhye P.C.

(57) ABSTRACT

An electronic device is provided. The electronic device is configured to display a 3-dimension (3D) image using the display, to receive a scroll input on the 3D image, to determine a scroll angular speed based at least on a scroll speed corresponding to the scroll input and a depth of the 3D image, to control the display to display the 3D image based on a first method based on the determined scroll angular speed being less than a specified angular speed, and control the display to display the 3D image based on a second method different from the first method based on the determined scroll angular speed being greater than or equal to the specified angular speed.

11 Claims, 9 Drawing Sheets

(56) References Cited

U.S. PATENT DOCUMENTS

| | | | |
|---|---|---|---|
| 2015/0040059 A1 | 2/2015 | Yuan | |
| 2015/0169054 A1 | 6/2015 | Wheeler et al. | |
| 2015/0177903 A1 | 6/2015 | Kim et al. | |
| 2015/0206321 A1 | 7/2015 | Scavezze et al. | |
| 2015/0324080 A1 | 11/2015 | Jin et al. | |
| 2015/0331240 A1* | 11/2015 | Poulos | G02B 27/017 345/8 |
| 2016/0252956 A1 | 9/2016 | Wheeler et al. | |
| 2016/0349972 A1* | 12/2016 | Miyoshi | G06F 16/26 |
| 2016/0370970 A1 | 12/2016 | Chu et al. | |
| 2017/0078652 A1* | 3/2017 | Hua | G02B 27/0172 |
| 2017/0219822 A1* | 8/2017 | Usami | G09G 3/20 |
| 2017/0220119 A1* | 8/2017 | Potts | G06F 3/017 |
| 2017/0269715 A1 | 9/2017 | Kim et al. | |
| 2018/0046341 A1* | 2/2018 | Lee | G06F 3/04817 |
| 2018/0240220 A1* | 8/2018 | Katori | G06F 3/04815 |
| 2018/0299973 A1 | 10/2018 | Kim et al. | |
| 2018/0365405 A1* | 12/2018 | Mistry | G06F 21/36 |
| 2019/0058859 A1* | 2/2019 | Price | H04N 13/111 |

FOREIGN PATENT DOCUMENTS

| | | |
|---|---|---|
| KR | 10-2015-0072764 | 6/2015 |
| KR | 10-2015-0110254 | 10/2015 |
| WO | 2014/000155 | 1/2014 |

OTHER PUBLICATIONS

Extended Search Report dated Jun. 5, 2019 in counterpart European Application No. 19150313.5.

* cited by examiner

ELECTRONIC DEVICE FOR CONTROLLING IMAGE DISPLAY BASED ON SCROLL INPUT AND METHOD THEREOF

CROSS-REFERENCE TO RELATED APPLICATION

This application is based on and claims priority under 35 U.S.C. § 119 to Korean Patent Application No. 10-2018-0001129, filed on Jan. 4, 2018, in the Korean Intellectual Property Office, the disclosure of which is incorporated by reference herein its entirety.

BACKGROUND

1. Field

The present disclosure relates to an electronic device for controlling image display based on a scroll input and a method thereof.

2. Description of Related Art

To enhance user experience, electronic devices with various types of immersive displays have been proposed. For example, to provide virtual reality (VR) environments to users, a head mounted display (HMD) device may be used. For example, an immersive display device such as an HMD device may display a 3-dimension (3D) image based on binocular disparity. In general, the immersive display may be located close to the eyes of the user for the immersion of the user.

The above information is presented as background information only to assist with an understanding of the present disclosure. No determination has been made, and no assertion is made, as to whether any of the above might be applicable as prior art with regard to the present disclosure.

When an image (e.g., a webpage) is provided through an immersive display, an immersive display device may scroll the image on the display depending on a scroll input. When a 2D webpage is simply displayed within a VR space, the immersive display device may scroll an image without considering perceptual characteristics of a human visual system (HVS). In this case, the visual fatigue of a viewer may be increased by physical characteristics of the immersive display.

For another example, in case of a 3D image, a mismatch between an accommodation distance and a convergence distance may occur. For example, while an image is scrolled, the viewer may feel visual fatigue due to the mismatch between the accommodation distance and the convergence distance.

SUMMARY

Example aspects of the present disclosure address at least the above-mentioned problems and/or disadvantages and provide at least the advantages described below. Accordingly, an example aspect of the present disclosure provides an electronic device for increasing the level of immersion of a viewer as well as reducing fatigue of the viewer in scrolling a 3D image and a method thereof.

In accordance with an example aspect of the present disclosure, an electronic device is provided. The electronic device may include at least one communication circuit configured to provide communication with at least one external electronic device, a display, and a processor configured to control the at least one communication circuit and the display. The processor may be configured to control the display to display a 3-dimension (3D) image using the display, to receive a scroll input on the 3D image, to determine a scroll angular speed based at least on a scroll speed corresponding to the scroll input and a depth of the 3D image, to control the display to display the 3D image based on a first method based on the determined scroll angular speed being less than a specified angular speed, and to control the display to display the 3D image based on a second method different from the first method based on the determined scroll angular speed being greater than or equal to the specified angular speed.

In accordance with another example aspect of the present disclosure, a head mounted display (HMD) device is provided. The HMD device may include an input/output interface comprising input/output circuitry, a display, and a processor configured to control the input/output interface and the display. The processor may be configured to control the display to display a 3D image using the display, to receive a scroll input on the 3D image, to determine a scroll angular speed based at least on a scroll speed corresponding to the scroll input and a depth of the 3D image, to control the display to display the 3D image depending on a first method based on the determined scroll angular speed being less than a specified angular speed, and to control the display to display the 3D image depending on a second method different from the first method based on the determined scroll angular speed being greater than or equal to the specified angular speed.

In accordance with another example aspect of the present disclosure, a method for displaying a 3D image is provided. The method may include displaying a 3D image on a display of the HMD device, receiving a scroll input on the 3D image, determining a scroll angular speed based at least on a scroll speed corresponding to the scroll input and a depth of the 3D image, controlling to display the 3D image depending on a first method based on the determined scroll angular speed being less than a specified angular speed, and controlling the display to display the 3D image depending on a second method different from the first method based on the determined scroll angular speed being greater than or equal to the specified angular speed.

According to various example embodiments disclosed in the present disclosure, the electronic device may reduce visual fatigue of the user by controlling image display based on a scroll speed.

According to various example embodiments, the electronic device may increase a sense of immersion of the user by controlling image display based on a scroll speed.

In addition, various effects directly or indirectly ascertained through the present disclosure may be provided.

Other aspects, advantages, and salient features of the disclosure will become apparent to those skilled in the art from the following detailed description, which, taken in conjunction with the annexed drawings, discloses various example embodiments of the present disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
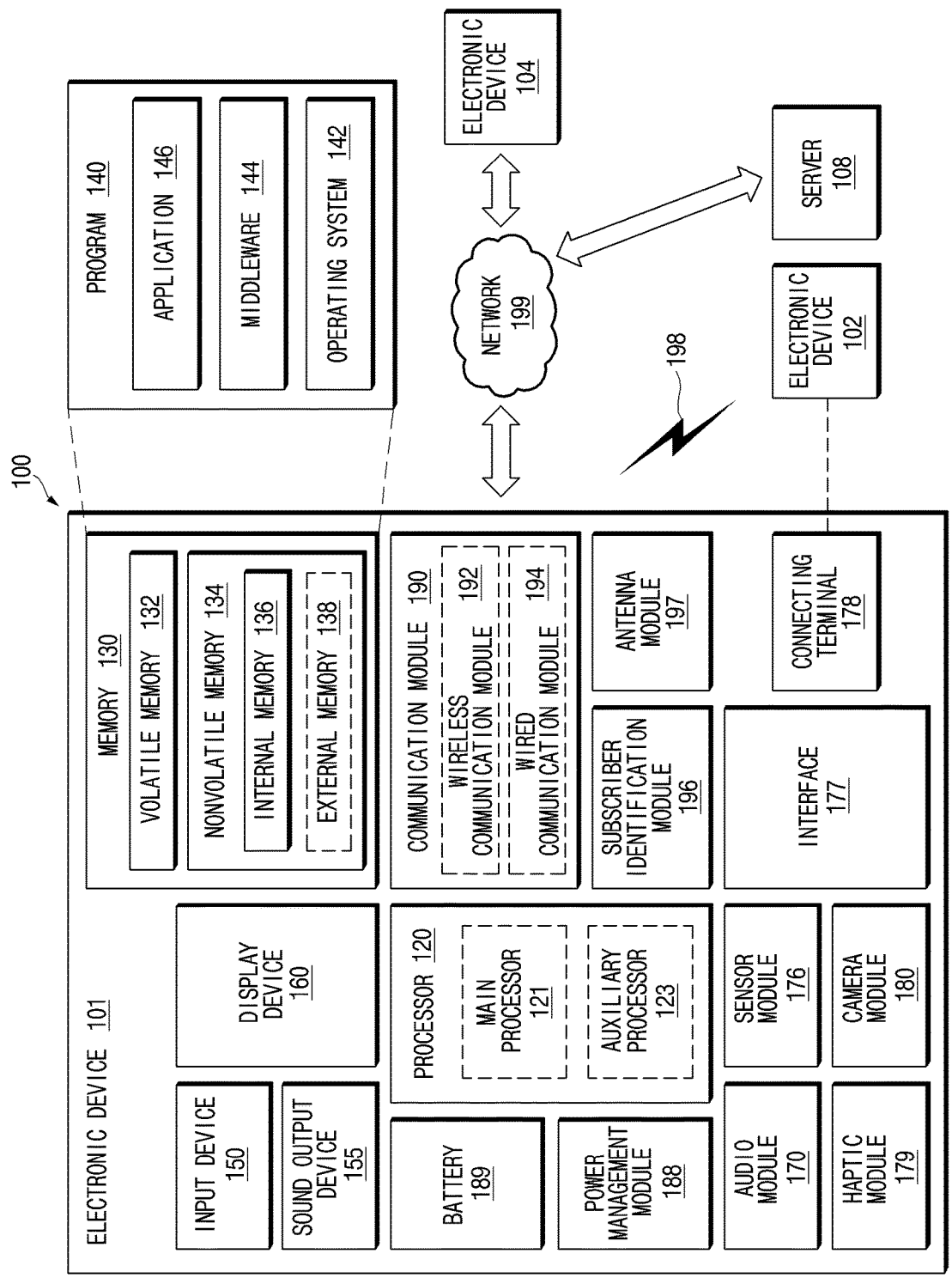
FIG. 1 is a block diagram illustrating an electronic device in a network environment according to various embodiments.

Hereinafter, various example embodiments of the present disclosure may be described with reference to accompanying drawings. Those of ordinary skill in the art will recognize that various modifications, equivalents, and/or alternatives of the various example embodiments described herein and terms used therefor may be made without departing from the scope and spirit of the present disclosure. With regard to description of drawings, similar components may be marked by similar reference numerals. The terms of a singular form may include plural forms unless otherwise specified. In the present disclosure, the expressions "A or B", "at least one of A or/and B", and the like may include all combinations of the associated listed items. The terms, such as "first", "second", and the like used in the present disclosure may be used to refer to various components regardless of the order and/or the priority and to distinguish the relevant components from other components, but do not limit the components. It will be understood that when a component (e.g., a first component) is referred to as being "(operatively or communicatively) coupled with/to" or "connected to" another component (e.g., a second component), it may be directly coupled with/to or connected to the other component or an intervening component (e.g., a third component) may be present.

According to the situation, the expression "configured to" used in the present disclosure may be interchangeably used as, for example, the expression "suitable for", "having the capacity to", "changed to", "made to", "capable of", or "designed to" in hardware or software or any combination thereof. In a certain situation, the expression "a device configured to" may refer to a situation in which the device is "capable of" operating together with another device or other parts. For example, a "processor configured to (or set to) perform A, B, and C" may refer, for example, and without limitation, to a dedicated processor (e.g., an embedded processor) for performing a corresponding operation, a general-purpose processor (e.g., a central processing unit (CPU) or an application processor) which performs corresponding operations by executing one or more software programs which are stored in a memory device, or the like.

An electronic device according to various example embodiments of the present disclosure may include at least one of, for example, and without limitation, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices, or the like. The wearable device may include, for example, and without limitation, at least one of an accessory type (e.g., watches, rings, bracelets, anklets, necklaces, glasses, contact lens, head-mounted-display devices (HMDs), or the like), a fabric or garment-integrated type (e.g., an electronic apparel), a body-attached type (e.g., a skin pad or tattoos), a bio-implantable type (e.g., an implantable circuit), or the like. In various example embodiments, the electronic device may include at least one of, for example, and without limitation, televisions (TVs), digital versatile disc (DVD) players, audios, refrigerators, air conditioners, cleaners, ovens, microwave ovens, washing machines, air cleaners, set-top boxes, home automation control panels, security control panels, media boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another example embodiment, an electronic device may include, for example, and without limitation, at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, drones, automated teller machines (ATMs), points of sales (POSs) of stores, internet of things (e.g., light bulbs, various sensors, electric or gas meters, sprinkler devices, fire alarms, thermostats, street lamps, toasters, exercise equipment, hot water tanks, heaters, boilers, and the like), or the like. According to various example embodiments, the electronic device may include, for example, and without limitation, at least one of parts of furniture, buildings/structures, or cars, electronic boards, electronic signature receiving devices, projectors, various measuring instruments (e.g., water meters, electricity meters, gas meters, or wave meters, and the like), or the like. In various example embodiments, the electronic device may, for example, and without limitation, be a flexible electronic device, combinations of two or more of the above-mentioned various devices, or the like. The electronic device according to an example embodiment, the present disclosure is not limited to the above-mentioned devices. In the present disclosure, the term "user" may refer to a person who uses an electronic device or may refer to a device (e.g., an artificial intelligence electronic device) that uses the electronic device.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

In various embodiments described below, the electronic device 101 may include at least one of a portable communication device (e.g., a smartphone), a computer device, a portable multimedia device, a portable medical device, a camera, a wearable device, a headset or form factor for supporting a virtual reality (VR) function, or a home appliance. Various operations of the electronic device 101, which will be described below, may be performed by the processor 120. For example, the processor 120 may control operations of the electronic device 101 based on instructions stored in the memory 130.

Figure 2:
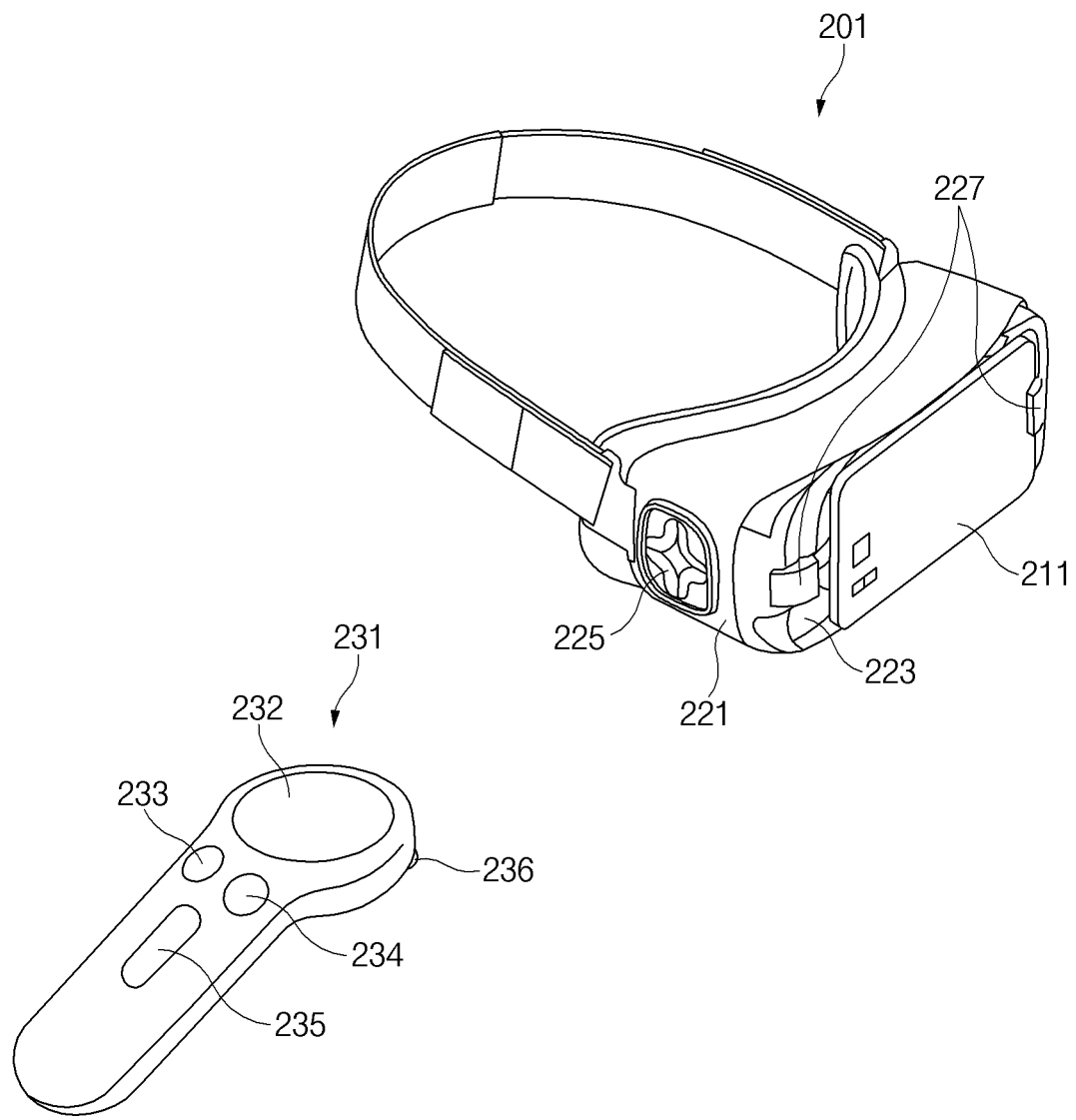
FIG. 2 is a diagram illustrating an example environment where an electronic device is operated, according to an embodiment.

FIG. 2 is a diagram illustrating an environment where an electronic device is operated, according to an example embodiment.

Referring to FIG. 2, an environment where an electronic device 201 is operated, according to an embodiment, may include a head mounted display (HMD) device 221, a first electronic device 211, and a second electronic device 231.

In an example embodiment of FIG. 2, the electronic device 201 may be configured as a combination of the HMD device 221 and the first electronic device 211. In this case, the HMD device 221 may correspond to an electronic device 102 of FIG. 1, and the first electronic device 211 may correspond to an electronic device 101 of FIG. 1. The first electronic device 211 may interact and operate with the HMD device 221. In this regard, the first electronic device 211 may be coupled to the HMD device 221. For example, the first electronic device 211 may be removably coupled to the HMD device 221 using at least one coupling member 227 provided on a front frame 223 of the HMD device 221.

The second electronic device 231 (e.g., the electronic device 102 of FIG. 1) may include, for example, and without limitation, a trigger button 236, a touch pad 232, a cancel button 233, a home button 234, and/or a volume button 235. The configuration of the second electronic device 231 shown in FIG. 2 is only illustrative, and the components may be changed. For example, the second electronic device 231 may include a joy stick rather than the touch pad 232 or may include the joy stick and the touch pad 232 together. For another example, the second electronic device 231 may fail to include at least one of the trigger button 236, the cancel button 233, the home button 234, and/or the volume button 235. For another example, the second electronic device 231 may further include another button other than the buttons shown in FIG. 2.

According to an embodiment, the second electronic device 231 may receive a user input through various components (e.g., the trigger button 236, the cancel button 233, the home button 234, and/or the volume button 235). For example, the second electronic device 231 may receive a swipe input, a touch input, and/or a click input, or the like, through the touch pad 232.

According to an embodiment, the second electronic device 231 may wirelessly communicate with the electronic device 201. For example, the second electronic device 231 may be wirelessly connected with the HMD device 221 and/or the first electronic device 211. For example, the first electronic device 211 may receive a user input, received in the second electronic device 231, directly from second electronic device 231 and/or via the HMD device 221.

According to an embodiment, the first electronic device 211 may include a display (e.g., a display device 160 of FIG. 1) for providing at least one visual content (e.g., a video, an image, or the like) to a user. The display of the first electronic device 211 may be coupled to the HMD device 211 to face the front frame 223 of the HMD device 221. For example, the user may view content which is being played on the display of the first electronic device 211 through a lens assembly (not shown) included on the front frame 223 of the HMD device 221.

According to an embodiment, the first electronic device 211 may display an image based on a single-eye mode (e.g., a function of outputting one screen on one display region) or a both-eye mode (e.g., a function of dividing one display region into a plurality of regions and outputting the same or different screens on the divided regions, respectively). When the first electronic device 211 outputs content based on the both-eye mode, the user may, for example, view virtual reality (VR) and/or augmented reality (AR) content, or the like, through the HMD device 221.

According to an embodiment, the first electronic device 211 may perform a specified operation in response to a user input received through an input/output interface (e.g., including input/output circuitry) 225 (e.g., a touch pad, a keypad, a wheel, or the like) of the HMD device 221. According to another embodiment, the first electronic device 211 may perform a specified operation in response to a user input received via the second electronic device 231. For example, the first electronic device 211 may output at least one content in response to a user input. For another example, the first electronic device 211 may scroll at least a portion of an output image in response to a user input.

In FIG. 2, an embodiment is illustrated by way of example as the electronic device 201 is configured as a combination of the two devices (e.g., the HMD device 221 and the first electronic device 211). However, embodiments are not limited thereto. According to another embodiment, the electronic device 201 may be implemented as one device. In this case, for example, the electronic device 201 may correspond to the electronic device 102 of FIG. 1. For example, the first electronic device 211 may be included in the HMD device 221. For example, the first electronic device 211 may be included in the electronic device 201 by being physically and/or functionally integrated with the HMD device 221. In this case, the operations and/or functions of the first electronic device 211 and the HMD device 221, described above with reference to FIG. 2, may be described as an operation and/or function performed by the electronic device 201.

Hereinafter, a description will be given of various operations of controlling image display in the electronic device 201 with reference to various drawings. For convenience of description, as shown in FIG. 2, it is assumed that the electronic device 201 is configured as a combination of the first electronic device 211 and the HMD device 221, but the configuration of the electronic device 201 is not limited thereto. In a description below, unless explicitly described to the contrary, the term "electronic device" may be referred to as the first electronic device 211.

Figure 3:
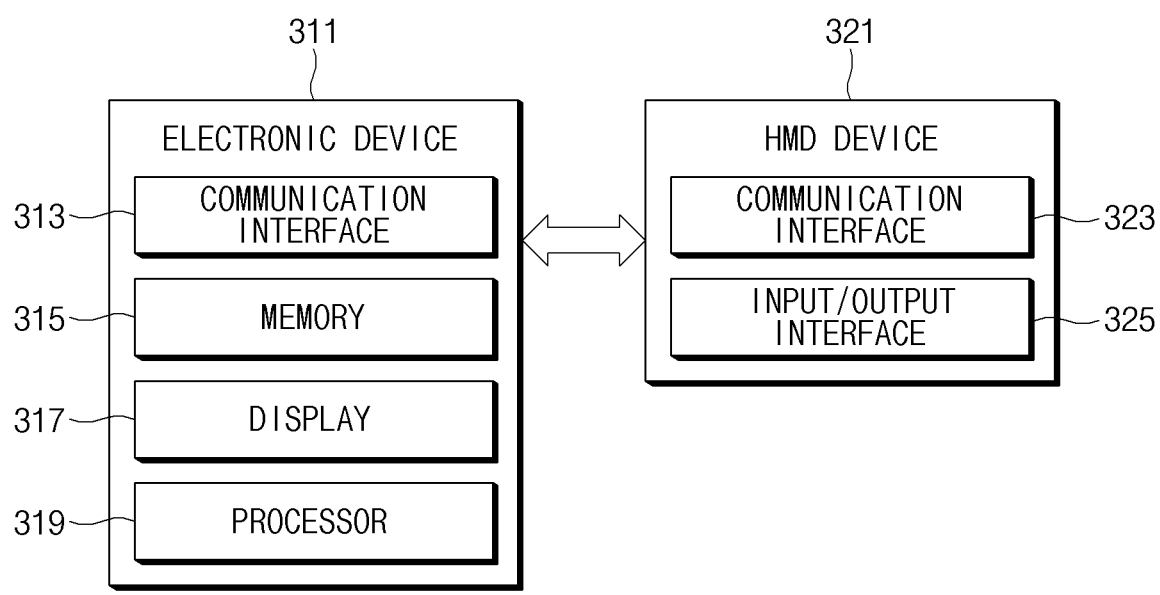
FIG. 3 is a block diagram illustrating an example electronic device according to an embodiment.

FIG. 3 is a block diagram illustrating an example electronic device according to an example embodiment.

Referring to FIG. 3, an electronic device 311 (e.g., an electronic device 101 of FIG. 1) may include a communication interface (e.g., including communication circuitry) 313 (e.g., a communication module 190 of FIG. 1), a memory 315 (e.g., a memory 130 of FIG. 1), a display 317 (e.g., a display device 160 of FIG. 1), and/or a processor (e.g., including processing circuitry) 319 (e.g., a processor 120 of FIG. 1). According to various example embodiments, the electronic device 311 may not include at least one of the above-mentioned components or may further include another component which is not shown.

According to an embodiment, the communication interface 313 (or a communication circuit) may include various communication circuitry and communicate with at least one external device (e.g., an electronic device 102 or an electronic device 104 of FIG. 1) via wired or wireless communication. For example, the communication interface 313 may include, for example, and without limitation, a connector, port, or the like, for supporting transmitting and receiving instructions and/or data with an HMD device 321.

According to an embodiment, the memory 315 may store instructions and/or data associated with at least one other component of the electronic device 311. The memory 315 may be electrically connected with the processor 319, and may store instructions for causing the processor 319 to control an operation of the electronic device 311. For example, the memory 315 may store at least one content and/or an application program associated with playing the content.

According to an embodiment, the display 317 may output at least one content (e.g., a video, an image, or the like) in response to a user input. For example, the display 317 may output content on one screen or a plurality of divided screens based on a content output mode set by a user. For another example, the display 317 may output at least one user interface (UI) for controlling content.

According to an embodiment, the processor 319 may include various processing circuitry and control operations of the electronic device 311. For example, the processor 319 may control content which is being played on the display 317, in response to a user input.

The HMD device 321 interacting with the electronic device 311 may support playing VR and/or AR content in connection with the viewing of the content of the user. For another example, the HMD device 321 may receive a user input and may transmit a signal corresponding to the received user input to the electronic device 311.

Referring to FIG. 3, the HMD device 321 may include a communication interface (e.g., including communication circuitry) 323 and an input/output interface (e.g., including input/output circuitry) 325 (e.g., an input/output interface 225 of FIG. 2). According to an embodiment, the communication interface 323 may communicate with the electronic device 311 and/or at least one external device based on wired or wireless communication. According to an embodiment, the communication interface 323 may include, for example, and without limitation, a connector, a port, or the like. According to an embodiment, the communication interface 323 may transmit instructions and/or data corresponding to a user input received from the HMD device 321 (e.g., the input/output interface 325 or an external electronic device (e.g., an electronic device 231 of FIG. 2)) to the electronic device 311.

According to an embodiment, the input/output interface 325 (e.g., a touch pad, a keypad, a joystick, a wheel, or the like) may receive an input from the user. For example, the HMD device 321 may transmit instructions and/or data for an input received through the input/output interface 325, using the communication interface 323.

According to an embodiment, the HMD device 321 may further include at least one speaker module (not shown). When content is played on the display 317 of the electronic device 311, the at least one speaker module may receive sound data associated with the content from the electronic device 311 and may output the received sound data in a stereo mode.

According to an example embodiment, the processor 319 may cause the electronic device 311 to display a 3D image using the display 317 and may receive a scroll input on the 3D image. For example, the processor 319 may receive a scroll input through the input/output interface 325 of the HMD device 321 or may receive a scroll input from the external electronic device (e.g., the second electronic device 231 of FIG. 2), using the communication interface 313.

According to an example embodiment, the processor 319 may determine a scroll angular speed based at least on a scroll speed corresponding to a scroll input and depth of a 3D image. For example, the processor 319 may determine the scroll angular speed based, for example, and without limitation, at least on resolution of the display 317, a size of the display 317, the scroll speed corresponding to the scroll input, and the depth of the 3D image.

According to an example embodiment, when the determined scroll angular speed is less than a specified angular speed, the processor 319 may control the electronic device 311 to display the 3D image based on a specified first method. According to another embodiment, the determined scroll angular speed is greater than or equal to the specified angular speed, the processor 319 may control the electronic device 311 to display the 3D image based on a specified second method different from the specified first method.

According to an example embodiment, when the processor 319 controls displaying of the 3D image based on the specified first method, the processor 319 may scroll at least a portion of the 3D image based on a scroll speed corresponding to a scroll input.

According to an example embodiment, when the processor 319 controls displaying of the 3D image based on the specified second method, the processor 319 may display the 3D image in a method capable of reducing visual fatigue of a viewer. For example, the second method may include, for example, and without limitation, at least one of: scrolling at least a portion of the 3D image at a threshold scroll speed, applying a blur effect to the at least portion of the 3D image while the at least portion of the 3D image is scrolled, and reducing depth of the 3D image while the at least portion of the 3D image is scrolled. For another example, the second method may include reducing, for example, and without limitation, at least one of brightness, a color, and contrast of the 3D image. For another example, the second method may include displaying a specified pop-up message on at least a portion of the 3D image while the at least portion of the 3D image is being scrolled.

According to an example embodiment, the HMD device 321 may include at least one components of the electronic device 311. For example, when the electronic device 311 is connected with (i.e., by inserting the electronic device 311 into the HMD device 321) the HMD device 321 or is physically or functionally integrated with the HDM device 321, the HMD device 321 may include the component (e.g., the memory 315, the display 317, the processor 319, or the like) of the electronic device 311. The HMD device 321 may perform the above-mentioned functions of the electronic device 311 based on the component included in the HMD device 321. For example, the HMD device 321 may output at least one content stored in its memory on its display and may control the display under control of its processor.

Figure 4:
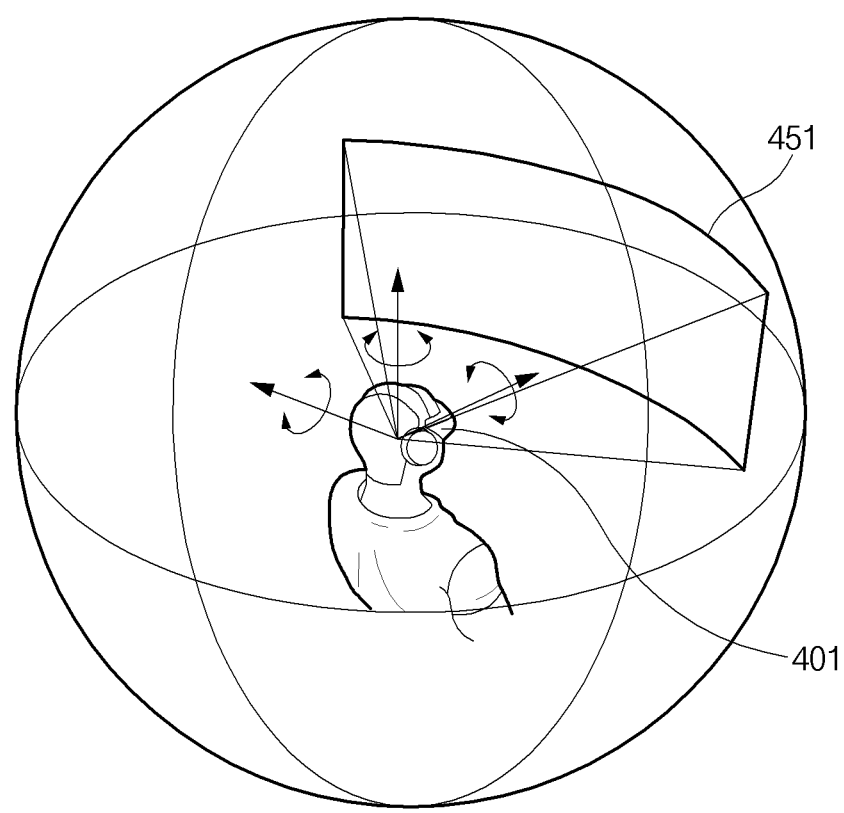
FIG. 4 is a diagram illustrating an example image display of an electronic device according to various embodiments.

FIG. 4 is a diagram illustrating an example image display of an electronic device according to various example embodiments.

Referring to FIG. 4, an electronic device 401 (e.g., an electronic device 101 of FIG. 1) may display a portion of a 3D virtual space using a display (e.g., a display device 160 of FIG. 1). For example, the electronic device 401 may display a display region 451 corresponding to a line of sight of a user on a virtual space. According to an embodiment, the electronic device 401 may detect a line of sight of a wearer by detecting an orientation, a direction and/or tilt of the electronic device 402 using a sensor module (e.g., a sensor module 176 of FIG. 1). For example, the electronic device 401 may detect an orientation, a direction and/or tilt of the electronic device 401 using, for example, and without limitation, a gyro sensor and/or an acceleration sensor, or the like.

According to an example embodiment, the electronic device 401 may output image content (e.g., a 360-degree video) having a viewing angle of greater than or equal to a viewing angle capable of being displayed on the display. For example, the user may change a field of view of content which is being played by moving the line of sight (e.g., by changing the orientation and/or the direction of the electronic device 401).

According to another example embodiment, the electronic device 401 may display an image within a displayed virtual space. For example, the image may be a webpage provided by a web browser. For another example, the image may be an image including a variety of information (e.g., text). The electronic device 401 may provide a corresponding image depending on various applications.

According to another example embodiment, the display region 451 in the virtual space may vary with the line of sight of the user. For example, the user may have a sense of deeper immersion by changing the displayed virtual space based on the line of sight. For the configuration of the virtual space, the electronic device 401 may display at least one 3D image within the display region 451. For example, the 3D image may include at least one of a background image, at least one object, or a 2D image having depth. Hereinafter, a more detailed description will be given of a method for displaying a 3D image with reference to FIG. 5.

Figure 5:
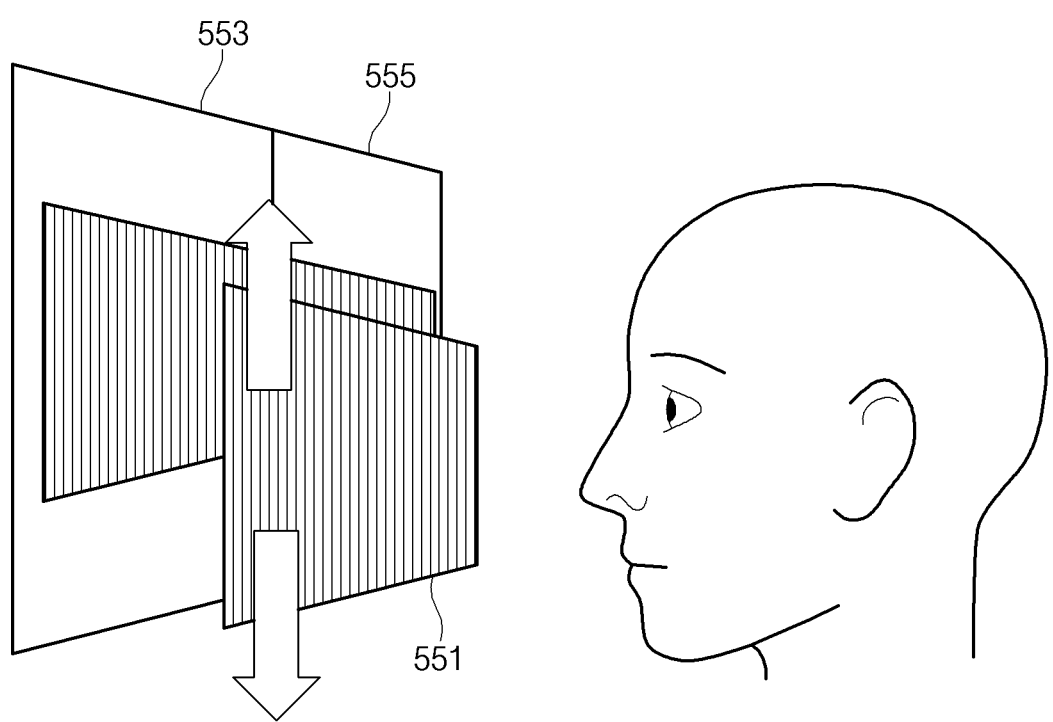
FIG. 5 is a diagram illustrating an example 3D image display of an electronic device according to various embodiments.

FIG. 5 is a diagram illustrating an example 3D image display of an electronic device according to various example embodiments.

Referring to FIG. 5, a left-eye image 553 and a right-eye image 555 may be displayed on a display (e.g., a display device 160 of FIG. 1) of an electronic device (e.g., an electronic device 101 of FIG. 1). According to an embodiment, a user of the electronic device may view a 3D image 551 having depth based on binocular disparity between the left-eye image 553 and the right-eye image 555. In FIG. 5, the left-eye image 553 and the right-eye image 555 are shown as being divided into the left and the right, but the division of the left-eye image 553 and the right-eye image 555 is not limited to an embodiment of FIG. 5. For example, the left-eye image 553 and the right-eye image 55 may be time-divided. For another example, the left-eye image 553 and the right-eye image 555 may be divided by a polarized lens. For another example, the left-eye image 553 and the right-eye image 555 may be divided on a color space.

According to an embodiment, the electronic device (e.g., an electronic device 211 of FIG. 2) may scroll at least a portion of the 3D image 551 based on a user input received from an input/output interface (e.g., an input/output interface 225 of FIG. 2) of an HMD device (e.g., an HMD device 221 of FIG. 2). For example, the input/output interface may include various input/output circuitry, such as, for example, and without limitation, a touch pad capable of receiving a touch input, or the like. In this case, the electronic device may scroll at least a portion of the 3D image 551 based on a swipe input on the touch pad. For another example, the input/output interface may include a rotatable input means (e.g., a knob). In this case, the electronic device may scroll at least a portion of the 3D image 551 based on a rotational input on the input/output interface.

According to an embodiment, the electronic device (e.g., a first electronic device 211 of FIG. 2) may scroll at least a portion of the 3D image 551 based on a user input received from an external electronic device (e.g., a second electronic device 231 of FIG. 2). For example, the electronic device may scroll at least a portion of the 3D image 551 based on a swipe input on a touch pad (e.g., a touch pad 232 of FIG. 2) of the external electronic device. For another example, the electronic device may scroll at least a portion of the 3D image 551 based on motion of the external electronic device. For another example, the electronic device may scroll at least a portion of the 3D image 551 based on motion of the external electronic device and a button (e.g., a trigger button 236, a touch pad 232, a cancel button 233, a home button 234, and/or a volume button 235) input.

According to an embodiment, the electronic device may determine a scroll speed of the 3D image 551 based at least on a user input. For example, the faster the swipe speed or the faster the motion of the external electronic device, the faster speed the electronic device may scroll at least a portion of the 3D image 551.

As described above in connection with FIG. 5, the electronic device may scroll at least a portion of the 3D image based on a scroll input. Hereinafter, a description will be given of a method for determining a scroll speed in an electronic device with reference to FIG. 6.

Figure 6:
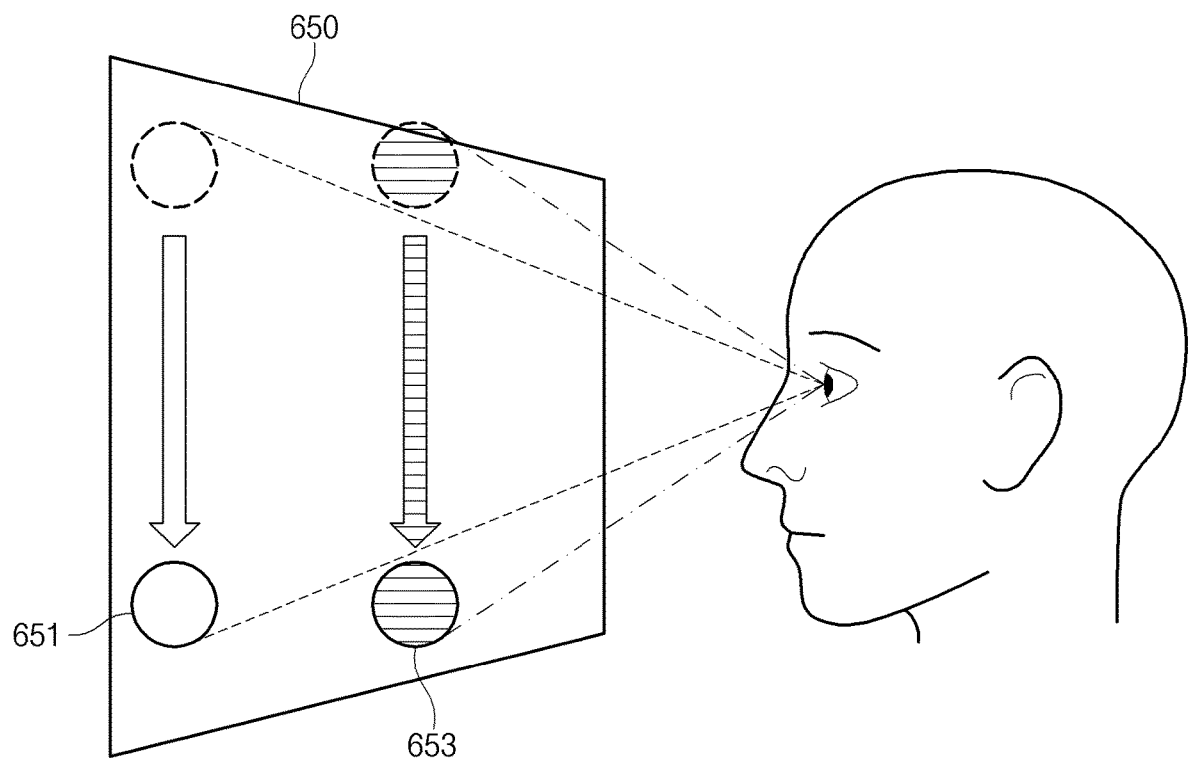
FIG. 6 is a diagram illustrating scrolling of a 3D image according to an embodiment.

FIG. 6 is a diagram illustrating scrolling of a 3D image according to an example embodiment.

Referring to FIG. 6, a first image 651 may be scrolled on a display 650 (e.g., a display device 160 of FIG. 1) of an electronic device (e.g., an electronic device 101 of FIG. 1). For convenience of description, the first image 651 is shown as one image, but may be configured with a left-eye image and a right-eye image. A second image 653 may be a 3D image having depth based on binocular disparity and may be scrolled based on the scrolling of the first image 651.

According to an embodiment, the display 651 may be an immersive display. Differing from a typical television or PC monitor viewing environment, the immersive display may have a relatively short viewing distance. As the viewing distance decreases, visual fatigue of a viewer may increase. For another example, the display 650 may provide a 3D image. For example, the second image 653 may be located closer to eyes of the viewer than the first image 651 due to depth. In this case, a viewing distance of the second image 653 may be shorter than that of the first image 651. For example, as the viewing distance decreases, the visual fatigue of the viewer may increase.

As shown in FIG. 6, although the first image 651 and the second image 653 are moved by the same pixel, as a viewing distance decreases, a movement angle of the second image 653 may be greater than that of the first image 651. In this regard, a description will be given of a scroll angular speed with reference to FIG. 7.

Figure 7:
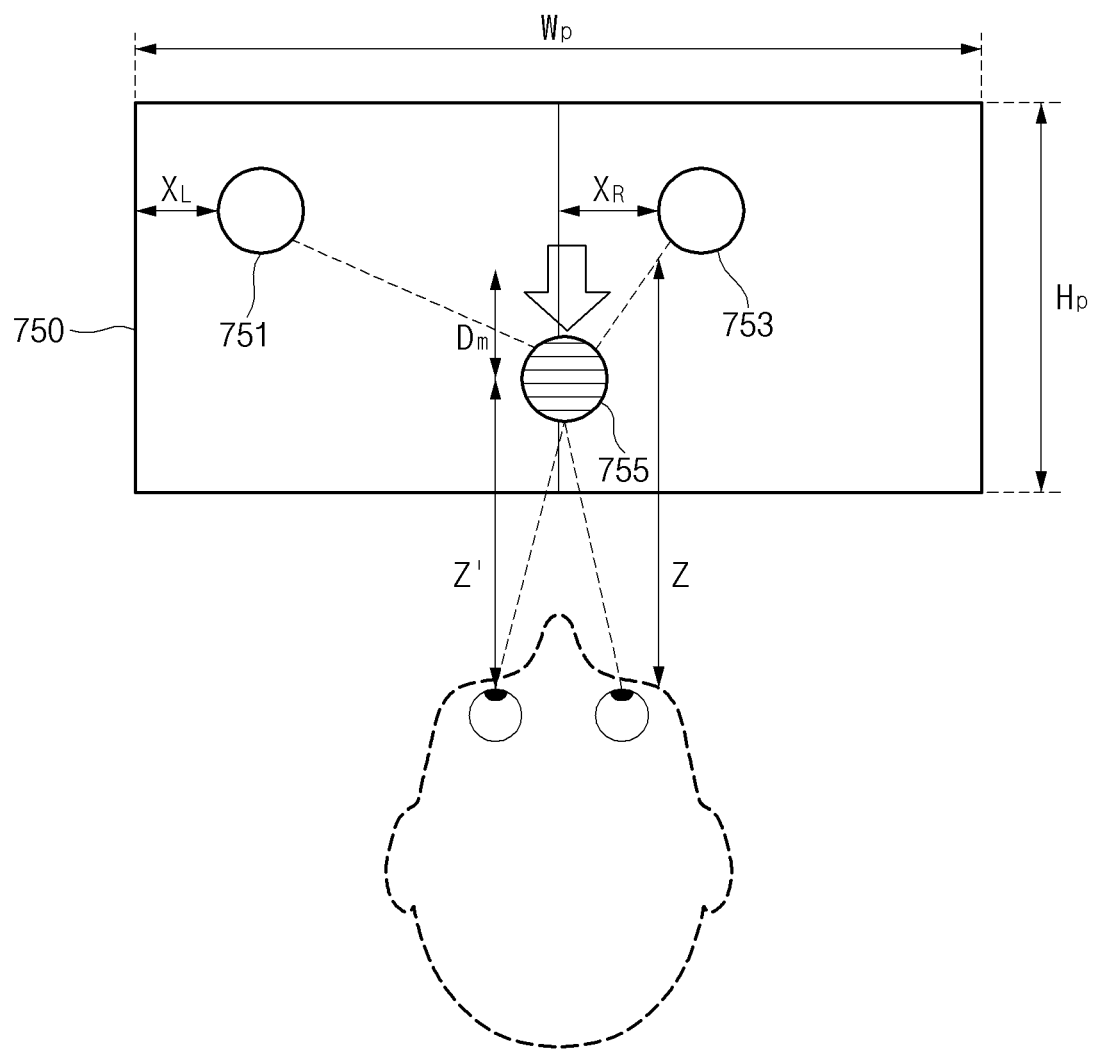
FIG. 7 is a diagram illustrating an example configuration of 3D image display according to an embodiment.

FIG. 7 is a diagram illustrating an example configuration of 3D image display according to an example embodiment.

Referring to FIG. 7, a left-eye image 751 or a right-eye image 753 may be displayed on a display 750 (e.g., a display device 160 of FIG. 1) of an electronic device (e.g., an electronic device 101 of FIG. 1). For another example, a 3D image 755 based on binocular disparity between the left-eye image 751 and the right-eye image 753 may be provided to a user by the electronic device. In FIG. 7, $W_p$ denotes the number of horizontal pixels (e.g., a horizontal resolution) of the display 750, and $H_p$ denotes the number of vertical pixels (e.g., a vertical resolution) of the display 750.

According to an embodiment, binocular disparity $D_p$ may be determined based on a difference between a left-eye image pixel location $(X_L)$ and a right-eye image pixel location $(X_R)$, and depth $D_m$ may represent depth (e.g., in meters) capable of being calculated based on the binocular disparity $D_p$. According to an embodiment, the electronic device may obtain the depth $D_m$ based, for example, at least on Equation 1 below.

$$D_m = \frac{2D'_p}{2E + 2D'_p} \quad \text{[Equation 1]}$$

In Equation 1 above, E denotes a distance between a left eyeball and a right eyeball of a user. According to an embodiment, E may be a specified value (e.g., about 0.063 m). According to another embodiment, E may be measured by the electronic device. In Equation 1 above, $D_p'$ may be calculated according to Equation 2 below. In Equation 2 below, $W_m$ denotes a horizontal length (e.g., in meters) of the display 750.

$$D'_p = \frac{W_m}{W_p} \times D_p \quad \text{[Equation 2]}$$

Z denotes a viewing distance based on a distance (e.g., in meters) between an eyeball location of the user and the display 750. According to an embodiment, the viewing distance Z may be preset. According to another embodiment, the viewing distance Z may be measured by a sensor of the electronic device. Z' denotes a stereoscopic effect (e.g., in meters) determined based on the viewing distance Z and the depth $D_m$.

Referring to FIG. 7, the description is given of the physical configuration and parameters for determining the scroll angular speed according to an embodiment. Hereinafter, a description will be given of the method for determining the scroll angular speed with reference to the parameter and physical configuration of FIG. 7.

Figure 8:
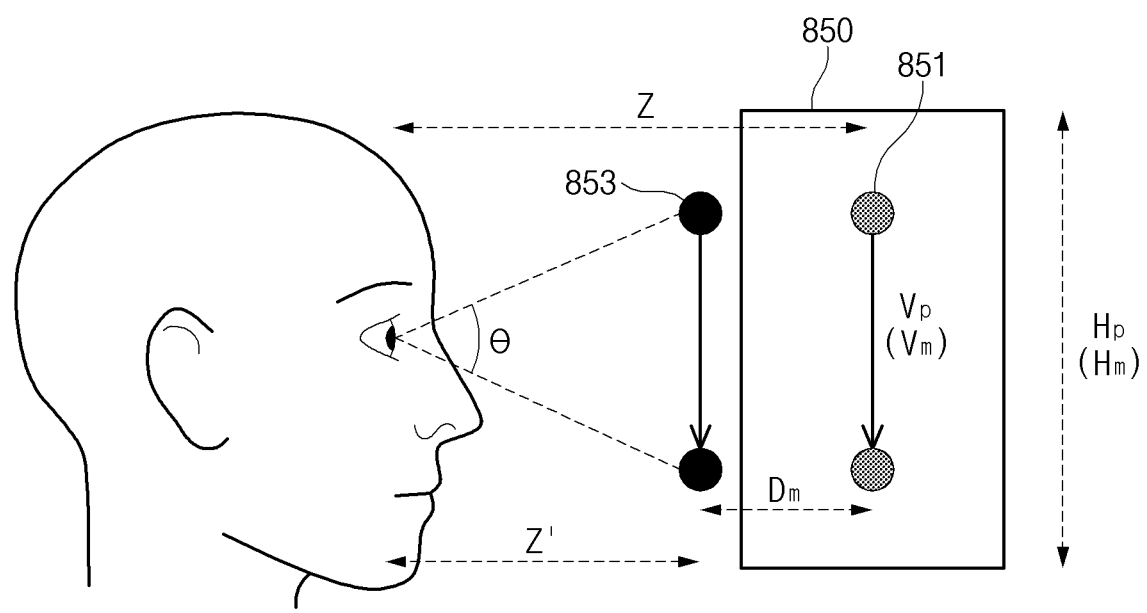
FIG. 8 is a diagram illustrating scrolling of an image based on an angular speed according to an embodiment.

FIG. 8 is a diagram illustrating scrolling of an image based on an angular speed according to an example embodiment.

Referring to FIG. 8, when a 3D image is provided on an immersive display (e.g., a display device 160 of FIG. 1), visual fatigue of a viewer may be increased due to decrease in viewing distance. According to an embodiment, an electronic device (e.g., an electronic device 101 of FIG. 1) for reducing fatigue may control to display a 3D image based on visual characteristics of a person.

According to an embodiment, the visual characteristics of the person may be derived from eye movement of the person. The eye movement of the person may be classified, for example, and without limitation, into the following four forms. First, there may be vestibular eye movement capable of uniformly focusing an image on the retina of the eye along head movement. Second, there may be smooth pursuit eye movement capable of tracking a moving object and uniformly focusing an image of the tracked object on the retina. Third, there may be saccade eye movement capable of focusing an image of an object of interest on the retina when a line of sight moves to the object. Fourth, there may be vergence eye movement capable of simultaneously focusing an image of one object on the retinas of both the eyes.

Referring to FIG. 8, a first image 851 may be scrolled on a display 850 (e.g., a display device 160 of FIG. 1) of an electronic device (e.g., an electronic device 101 of FIG. 1). The first image 851 is shown as one image for convenience of description, but may be configured with a left-eye image and a right-eye image. A second image 853 may be an image having depth $D_m$ based on binocular disparity and may be scrolled as the first image 851 is scrolled. In FIG. 8, a value obtained by subtracting the depth $D_m$ from a viewing distance Z may be the same as a stereoscopic effect Z'. Moreover, θ denotes a scroll angular speed (degree/sect).

According to an embodiment, as the second image 853 is scrolled, a user may track the second image 853. In this case, the user may track the second image 853 based on the smooth pursuit eye movement among eye movements. In tracking based on the smooth pursuit eye movement, a speed at which a person may perfectly track an image may be designated as an angular speed of about 20 to 30 degrees per second. For another example, a maximum speed at which the person may tracks any image may be designated as an angular speed of about 80 degrees per second. For example, when an object is scrolled at a speed of greater than an angular speed of a constant level, the eyes of the person may partially track the object or may fail to track the object. In this case, visual fatigue may be increased due to the repetition of unconscious eye tracking movement. According to an embodiment, the scrolling of an image may be controlled based on a scroll angular speed. Hereinafter, a description will be given of an image scroll control method according to a scroll angular speed according to the embodiment of FIG. 8.

A relationship like Equation 3 below may be established based on the configuration of FIG. 8.

$$\tan\frac{\theta}{2} = \frac{1}{2}\frac{V_m}{Z'} \qquad \text{[Equation 3]}$$

In Equation 3 above, $V_m$ denotes a scroll speed in meter/sec unit, converted from a scroll speed $V_p$ based on a size and resolution of the display 850. As shown in FIG. 8, when an image is vertically scrolled, the scroll speed $V_m$ may be obtained by multiplying a value obtained by dividing the scroll speed $V_p$ by a vertical resolution $H_p$ (e.g., for each pixel) of the display 850 by a vertical length $H_m$ (e.g., in meters) of the display 850.

According to an embodiment, the electronic device (e.g., an electronic device 311 of FIG. 3) may obtain the scroll speed $V_p$ (pixel/sec) based at least on a scroll input on the first image 851 or the second image 853. A description of the scroll input may refer to the description of the scroll input described above in connection with FIG. 5.

In FIG. 8, a vertical resolution $H_p$ and a vertical length $H_m$ may be used based on scrolling of a vertical direction, but the scroll direction is not limited thereto. According to another embodiment, a horizontal resolution and a horizontal length of the display 850 may be applied to scrolling in a horizontal direction. According to another embodiment, the scrolling may be performed in any direction, and the horizontal direction and/or resolution and length may be used for the scrolling.

Equation 3 above may be arranged as Equation 4 below.

$$\theta = 2 \times \tan^{-1}\left(\frac{V_m}{2Z'}\right) \qquad \text{[Equation 4]}$$

When arranged based on a relationship between $V_m$ and $V_p$, Equation 4 above is Equation 5 below.

$$\theta = 2 \times \tan^{-1}\left(\frac{H_m}{2H_pZ'}V_p\right) \qquad \text{[Equation 5]}$$

According to an embodiment, the vertical length $H_m$ of the display 850 may be a specified value. For example, $H_m$ may be a predefined value based on a physical characteristic of the display 850.

According to an embodiment, the vertical resolution $H_p$ of the display 850 may be a specified value (e.g., a predefined value) or may be designated according to an application associated with the first image 851. According to another embodiment, the vertical resolution $H_p$ may be a value specified based on a user input.

According to an embodiment, the electronic device may obtain depth $D_m$ based on binocular disparity. Furthermore, the viewing distance may be a specified value. For example, the viewing distance Z may be predefined based on a physical characteristic of the electronic device or an HMD device (e.g., an HMD device 221 of FIG. 2). For example, the viewing distance Z may be sensed by at least one sensor included in the electronic device or the HMD device. According to an embodiment, the electronic device may obtain the stereoscopic effect Z' based at least on the depth $D_m$ of the second image 853.

According to an embodiment, the electronic device may determine a scroll angular speed θ based at least on a scroll speed based on a scroll input and the depth $D_m$ of the second image 853. For example, the electronic device may obtain the scroll angular speed θ using Equations 4 and 5 above. For example, each of the other elements except for the scroll speed and the depth $D_m$ of the second image 853 in Equations 4 and 5 above may be a specified value (e.g., a predefined value).

According to an embodiment, the electronic device may provide control to scroll the second image 853 based on the scroll angular speed θ corresponding to a scroll input. For example, when the scroll angular speed θ is less than or equal to a specified first angular speed (e.g., a specific value of a range of greater than or equal to an angular speed at which the eyes may perfectly track an object and less than or equal to a maximum angular speed at which the eyes may track the object or a specific value of a range of greater than or equal to an angular speed at which the eyes may perfectly track the object and less than or equal to an angular speed at which the eyes may fail to track the object), the electronic device may control to scroll the second image 853 according to a first method. When the scroll angular speed is greater than the specified first angular speed, the electronic device may control to scroll the second image 853 according to a second method. Hereinafter, the controlling to scroll the second image 853 may include controlling to scroll the first image 851.

According to an example embodiment, when the scroll angular speed θ corresponding to the scroll input is less than or equal to the specified first angular speed, the electronic device may scroll the second image 852 at a speed corresponding to the scroll input or at the angular speed θ corresponding to the scroll input. When the scroll angular speed θ is greater than the specified first angular speed, to reduce visual fatigue of a user, the electronic device may control to scroll the second image 853 in a manner different from a manner where the scroll angular speed θ is less than or equal to the first angular speed.

According to an example embodiment, when the scroll angular speed θ corresponding to the scroll input is greater than the specified first angular speed, the electronic device may scroll the second image 853 at a specified second speed or a specified second angular speed. For example, the specified second angular speed may be a value which is the same or less than the specified first angular speed. For another example, the specified first angular speed and the specified second angular speed may be a value within a range of about 20 to 30 deg/sec. For another example, the specified first angular speed and/or the specified second angular speed may be set based on a user input.

According to an example embodiment, the electronic device may provide a user interface for selecting the specified first angular speed on the display 850. For example, the electronic device may provide a plurality of demo scroll steps, each of which has a different scroll speed. In this case, the user may set a threshold angular speed by selecting a demo scroll step corresponding to a desired threshold angular speed (e.g., the specified first angular speed) or performing a user input corresponding to the desired threshold angular speed.

According to an example embodiment, when the scroll angular speed θ corresponding to the scroll input is greater than the specified first angular speed, the electronic device may apply a blur (e.g., motion blur) effect to at least a portion of the second image 853. In this case, as a blurred image is provided in response to scrolling an image incapable of being tracked, visual fatigue of the user may be reduced. For example, the electronic device may scroll the second image 853 at a speed or angular speed corresponding to the scroll angular speed θ and may apply the blur effect to at least a portion of the second image 853 while the second image 853 is scrolled. For another example, the electronic device may scroll the second image 853 at the specified second angular speed (e.g., the specified first angular speed or more) and may apply the blur effect to at least a portion of the second image 853 while the second image 853 is scrolled.

According to an example embodiment, when the blur effect is applied, the electronic device may control the magnitude of the blur effect based on an input speed. For example, the electronic device may scroll the second image 853 at the scroll angular speed θ corresponding to the scroll input and may apply a stronger blur effect to at least a portion of the second image 853 depending on the scroll angular speed θ. As the scroll angular speed θ is faster, the electronic device may provide a more blurred image. For example, as the blur effect increases according to the scroll angular speed θ, the electronic device may adjust a threshold and/or radius of the blur effect.

According to an example embodiment, when the scroll angular speed θ corresponding to the scroll input is greater than the specified first angular speed, the electronic device may reduce the depth $D_m$ of the second image 853. For example, the electronic device may decrease the depth $D_m$ of the second image 853 by reducing binocular disparity. When the depth $D_m$ is reduced, an angular speed the user feeds may be decreased due to an increase in stereoscopic effect Z', resulting in reduced visual fatigue of the user. For example, the electronic device may scroll the second image 853 at a speed or an angular speed corresponding to the scroll angular speed θ and may reduce the depth $D_m$ of the second image 853 while the second image 853 is scrolled. For another example, the electronic device may scroll the second image 853 at the specified second angular speed (e.g., the specified first angular speed or more) and may reduce the depth $D_m$ of the second image 853 while the second image 853 is scrolled.

According to an example embodiment, the electronic device may decrease the depth $D_m$ of the second image 853 to a specified value. For example, when a scroll angular speed corresponding to an input speed is greater than or equal to the specified first angular speed, the electronic device may decrease the depth value $D_m$ of the second image 853 to the specified value. According to another embodiment, the electronic device may reduce the depth $D_m$ of the second image 853 based on an input speed. For example, the larger the scroll angular speed θ corresponding to the scroll input, the more the electronic device may reduce the depth $D_m$ of the second image 853.

According to an example embodiment, when the scroll angular speed θ corresponding to the scroll input is greater than the specified first angular speed, the electronic device may change display properties (e.g., brightness, a color, and/or contrast) of at least a portion of the second image 853. For example, the electronic device may scroll the second image 853 at a speed or an angular speed corresponding to scroll angular speed θ and may reduce brightness, a color, and/or contrast of at least a portion of the second image 853 while the second image 853 is scrolled.

According to an example embodiment, when the scroll angular speed θ corresponding to the scroll input is greater than the specified first angular speed, the electronic device may provide a pop-up message. For example, the electronic device may scroll the second image 853 at a speed or an angular speed corresponding to the scroll angular speed θ and may output a pop-up message on at least a portion of the second image 853 while the second image 853 is scrolled. The electronic device may reduce visual fatigue as the user tracks an object by outputting a pop-up message on the foreground while the second image 853 is scrolled on the background.

According to an example embodiment, when the scroll angular speed θ corresponding to the scroll input is greater than the specified first angular speed, the electronic device may blur at least a portion of the second image 853 while the second image 853 is scrolled.

According to an example embodiment, when the scroll angular speed θ corresponding to the scroll input is greater than the specified first angular speed, the electronic device may shorten the scrolling of the second image 853. For example, rather than scrolling the second image 853 depending on a scroll input, the electronic device may display the second image moved to a final location corresponding to the scroll input on the display 850. Furthermore, in conversion from an image before scrolling to an image after the scrolling, the electronic device may perform image conversion based on various visual effects (e.g., dissolve and fade) for a scene change.

The above-mentioned various example embodiments for reducing the visual fatigue of the user are illustrative, and the method for controlling the image display in the present disclosure is not limited thereto. For example, various effects for reducing fatigue capable of being generated based on scrolling may be used other than the above-mentioned embodiments. According to an example embodiment, the electronic device may provide an effect of avoiding the tracking of the eyes or breaking up the line of sight in response to fast scrolling. For example, when the scroll angular speed θ corresponding to the scroll input is greater than the specified first angular speed, the electronic device may avoid the object tracking of the user by reducing an amount of visual information of the second image 853.

For another example, the above-mentioned various example embodiments for reducing the visual fatigue of the user may be combined with each other. For example, while scrolling is performed, the electronic device may reduce brightness, a color, and/or contrast concurrently with applying the blur effect to the second image 853. For another example, while scrolling is performed, the electronic device may display a pop-up message on the second image 853 concurrently with applying the blur effect to the second image 853. For another example, while scrolling is performed, the electronic device may reduce depth of the second image 853 and may apply the blur effect and/or another visual effect to the second image 853.

Figure 9:
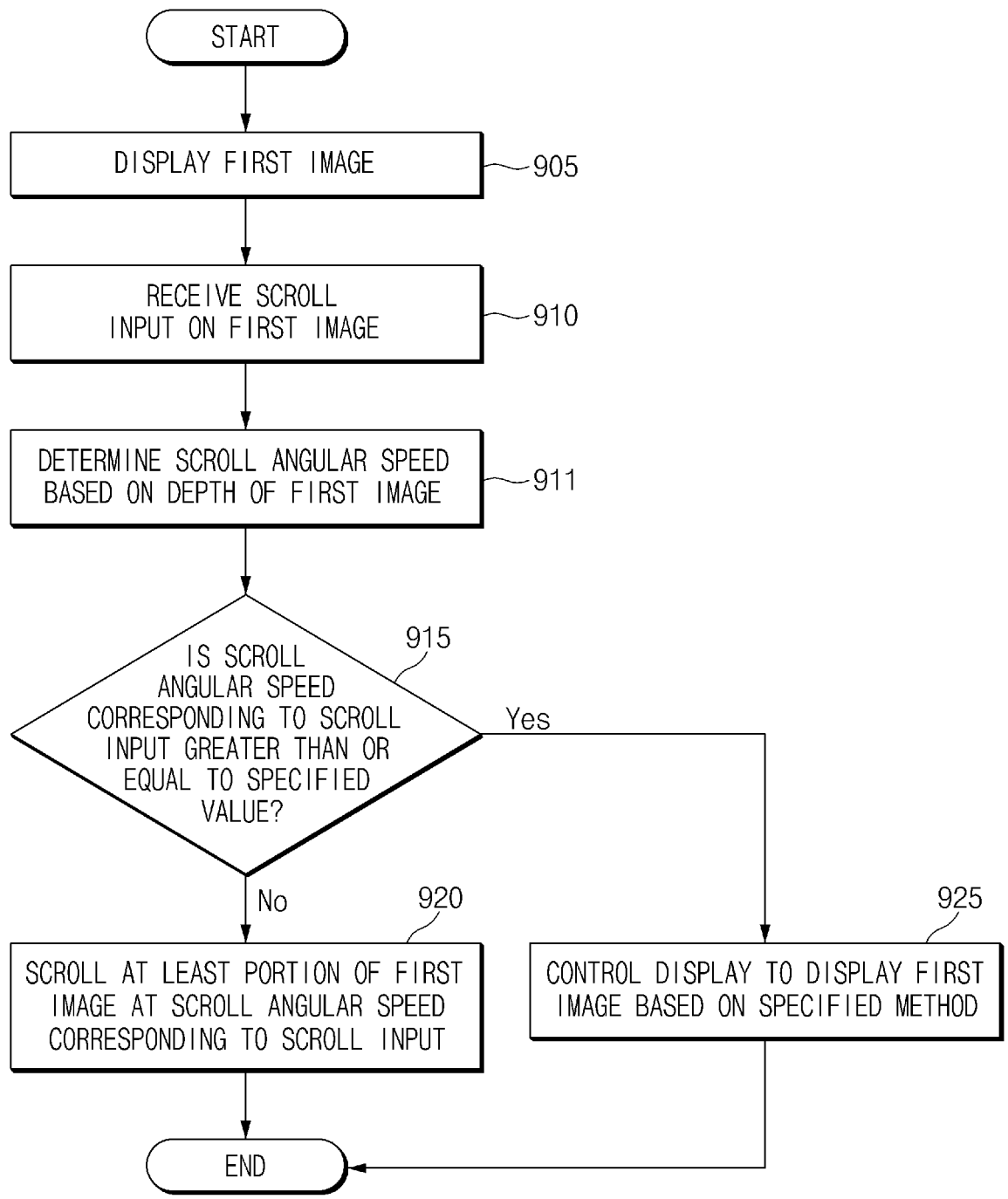
FIG. 9 is a flowchart illustrating an example image display control method according to various embodiments.

FIG. 9 is a flowchart illustrating an example image display control method according to various example embodiments.

Referring to FIG. 9, the method for controlling the image display in FIG. 9 may be performed by an electronic device (e.g., an electronic device 101 of FIG. 1). For example, operations of the electronic device may be performed by a processor (e.g., a processor 120 of FIG. 1) of the electronic device.

In operation 905, the electronic device may display a first image on a display (e.g., a display device 160 of FIG. 1). For example, the electronic device may display the first image having depth based on binocular disparity. According to an embodiment, the first image may include a webpage.

In operation 910, the electronic device may receive a scroll input on the first image. For example, the electronic device may receive a scroll input from an input/output interface located on the exterior of the electronic device. For another example, the electronic device may receive a scroll input from an HMD device (e.g., an HMD device 221 of FIG. 2) connected with the electronic device or an external electronic device (e.g., a second electronic device 231 of FIG. 2). A description of the scroll input may refer to the description associated with FIG. 5

In operation 911, the electronic device may determine a scroll angular speed based on the depth of the first image. For example, the electronic device may determine the scroll angular speed based, for example, and without limitation, at least on resolution of the display, a size of the display, a scroll speed corresponding to the scroll input, and the depth of the first image. The determination of the scroll angular speed may refer to the description above with reference to FIG. 7.

In operation 915, the electronic device may determine whether a scroll angular speed corresponding to the scroll input is greater than or equal to a specified value. For example, the electronic device may determine the scroll angular speed corresponding to the scroll input depending on the methods described above in connection with FIGS. 7 and 8. For another example, the electronic device may determine whether the scroll angular speed is greater than or equal to the specified value (e.g., a specified angular speed). For another example, the electronic device may determine whether the scroll angular speed is greater than the specified value.

When the scroll angular speed is less than the specified value, in operation 920, the electronic device may scroll at least a portion of the first image at a scroll speed (e.g., the scroll angular speed) corresponding to the scroll input.

When the scroll angular speed is greater than or equal to the specified value, in operation 925, the electronic device may control the display to display the first image based on a specified method. According to an embodiment, the electronic device may control the display to display the first image in a method capable of reducing viewing fatigue. For example, the electronic device may scroll the first image at a reduced scroll speed, may display the first image at reduced depth, may adjust display properties (e.g., brightness, a color, and/or contrast) of the first image, or may apply any effect (e.g., a blur effect) to the first image. The description of controlling to display the first image may refer to the description above with reference to FIG. 9.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device configured to interact with a head mounted display (HMD) device, the electronic device comprising:
at least one communication circuit configured to provide communication with at least one external electronic device;
a display; and
a processor operatively connected with the at least one communication circuit and the display, wherein the processor is configured to:
display a 3-dimesional (3D) image with a first depth using the display;
receive a scroll input for the 3D image;
determine a scroll speed according to the scroll input;
determine a scroll angular speed based at least on the scroll speed corresponding to the scroll input and the first depth of the 3D image, wherein the scroll angular speed increases as the scroll speed is increased and decreases as the first depth is decreased;
when the determined scroll angular speed is less than a specified angular speed, control the display to scroll the 3D image according to the scroll speed, without adding a blur effect to the 3D image and without reducing a brightness, a color, and a contrast of the 3D image while scrolling the 3D image; and
when the determined scroll angular speed is greater than or equal to the specified angular speed, control the display to:
scroll the 3D image according to the scroll speed, and while scrolling the 3D image, reduce a depth of the 3D image from the first depth to a second depth, add a blur effect to the 3D image, and reduce at least two of the brightness, the color, and the contrast of the 3D image,
wherein the scroll angular speed is determined based on an equation:

$$\tan\frac{\theta}{2} = \frac{1}{2}\frac{V_m}{Z'},$$

where θ denotes the scroll angular speed, $V_m$ denotes the scroll speed, and Z' denotes a stereoscopic effect, and
wherein the stereoscopic effect is determined by subtracting the first depth from a viewing distance of a user wearing the HMD device.

2. The electronic device of claim 1, wherein the processor is further configured to, when the determined scroll angular speed is greater than or equal to the specified angular speed, control the display to:
display a pop-up message on at least a portion of the 3D image while scrolling the 3D image.

3. The electronic device of claim 1, wherein the processor is configured to:
determine the scroll angular speed based at least on a resolution of the display, a size of the display, the scroll speed corresponding to the scroll input, and the depth of the 3D image.

4. The electronic device of claim 1, wherein the electronic device is configured to receive the scroll input via the HMD device.

5. The electronic device of claim 4, wherein the processor is configured to:
receive the scroll input from the at least one external electronic device using the at least one communication circuit.

6. A head mounted display (HMD) device, comprising:
an input/output interface comprising input/output circuitry;

a display; and a processor configured to control the input/output interface and the display, wherein the processor is configured to:

display a 3D image with a first depth using the display;

receive a scroll input on the 3D image;

determine a scroll speed according to the scroll input;

determine a scroll angular speed based at least on the scroll speed corresponding to the scroll input and the first depth of the 3D image, wherein the scroll angular speed increases as the scroll speed is increased and decreases as the first depth is decreased;

when the determined scroll angular speed is less than a specified angular speed, control the display to scroll the 3D image according to the scroll speed, without adding a blur effect to the 3D image and without reducing a brightness, a color, and a contrast of the 3D image while scrolling the 3D image; and when the determined scroll angular speed being greater than or equal to the specified angular speed, control the display to:

scroll the 3D image according to the scroll speed, and while scrolling the 3D image, reduce a depth of the 3D image from the first depth to a second depth, add a blur effect to the 3D image, and reduce at least two of the brightness, the color, and the contrast of the 3D image, wherein the scroll angular speed is determined based on an equation:

$$\tan\frac{\theta}{2} = \frac{1}{2}\frac{V_m}{Z'},$$

where θ denotes the scroll angular speed, $V_m$ denotes the scroll speed, and Z' denotes a stereoscopic effect, and wherein the stereoscopic effect is determined by subtracting the first depth from a viewing distance of a user wearing the HMD device.

7. The HMD device of claim 6, wherein the processor is further configured to, when the determined scroll angular speed is greater than or equal to the specified angular speed, control the display to:

display a pop-up message on at least a portion of the 3D image while scrolling the 3D image.

8. The HMD device of claim 6, wherein the processor is configured to:

determine the scroll angular speed based at least on a resolution of the display, a size of the display, the scroll speed corresponding to the scroll input, and the depth of the 3D image.

9. The HMD device of claim 6, wherein the processor is configured to:

receive the scroll input using the input/output interface.

10. A method for displaying a 3D image in a head mounted display (HMD) device, the method comprising:

displaying a 3D image with a first depth on a display of the HMD device;

receiving a scroll input on the 3D image;

determining a scroll speed according to the scroll input;

determining a scroll angular speed based at least on the scroll speed corresponding to the scroll input and the first depth of the 3D image, wherein the scroll angular speed increases as the scroll speed is increased and decreases as the first depth is decreased;

when the determined scroll angular speed is less than a specified angular speed, scrolling the 3D image according to the scroll speed, without adding a blur effect to the 3D image and without reducing a brightness, a color, and a contrast of the 3D image while scrolling the 3D image; and when the determined scroll angular speed is greater than or equal to the specified angular speed:

scrolling the 3D image displayed according to the scroll speed, and during scrolling the 3D image, reducing a depth of the 3D image from the first depth to a second depth, adding a blur effect to the 3D image, and reducing at least two of the brightness, the color, and the contrast of the 3D image the brightness, wherein the scroll angular speed is determined based on an equation:

$$\tan\frac{\theta}{2} = \frac{1}{2}\frac{V_m}{Z'},$$

where θ denotes the scroll angular speed, $V_m$ denotes the scroll speed, and Z' denotes a stereoscopic effect, and wherein the stereoscopic effect is determined by subtracting the first depth from a viewing distance of a user wearing the HMD device.

11. The method of claim 10, further comprising:

when the determined scroll angular speed is greater than or equal to the specified angular speed, displaying a pop-up message on at least a portion of the 3D image while scrolling the 3D image.

* * * * *